United States Patent [19]
Roderick

[11] 4,244,979
[45] Jan. 13, 1981

[54] OVEN-TYPE APPARATUS AND METHOD

[75] Inventor: Ronald R. Roderick, Evergreen, Colo.

[73] Assignee: National Equipment Corporation, Denver, Colo.

[21] Appl. No.: 37,759

[22] Filed: May 10, 1979

[51] Int. Cl.³ .......................... A23L 1/00; C12C 3/04; A23B 4/04
[52] U.S. Cl. ..................... 426/418; 99/474; 99/447; 126/21 A; 426/523; 426/506
[58] Field of Search ............... 126/21 A, 21 R, 19 M; 99/474, 447, 477; 426/418, 506, 419, 523; 312/236; 219/401, 400

[56] References Cited
U.S. PATENT DOCUMENTS

| | | | |
|---|---|---|---|
| 3,658,047 | 4/1972 | Hoppel | 126/21 A |
| 3,999,475 | 12/1976 | Roderick | 99/474 |
| 4,039,776 | 8/1977 | Roderick | 126/21 A X |
| 4,062,983 | 12/1977 | Roderick | 426/418 |

*Primary Examiner*—George T. Hall
*Attorney, Agent, or Firm*—Ancel W. Lewis, Jr.

[57] ABSTRACT

The problem of properly cooking food and handling heated food so that it retains a fresh-cooked taste, fragrance and appealing appearance is solved by apparatus that includes an inner wall means (15) defining an inner chamber (16) and an outer wall means (17) defining an air circulating passage (18) extending in a loop around the inner wall means. Louvered slots (28) with inclined fins (29) are provided in the inner wall means along said air circulating passage that are sufficiently narrow to confine the circulating air substantially to said passage without a significant amount of airflow in direct contact with the food in said chamber and at the same time arranged to permit moisture and heat to diffuse between the circulating passage in the inner chamber via said apertures to control the moisture and heat in the chamber and establish a substantially uniform temperature throughout said chamber.

27 Claims, 8 Drawing Figures

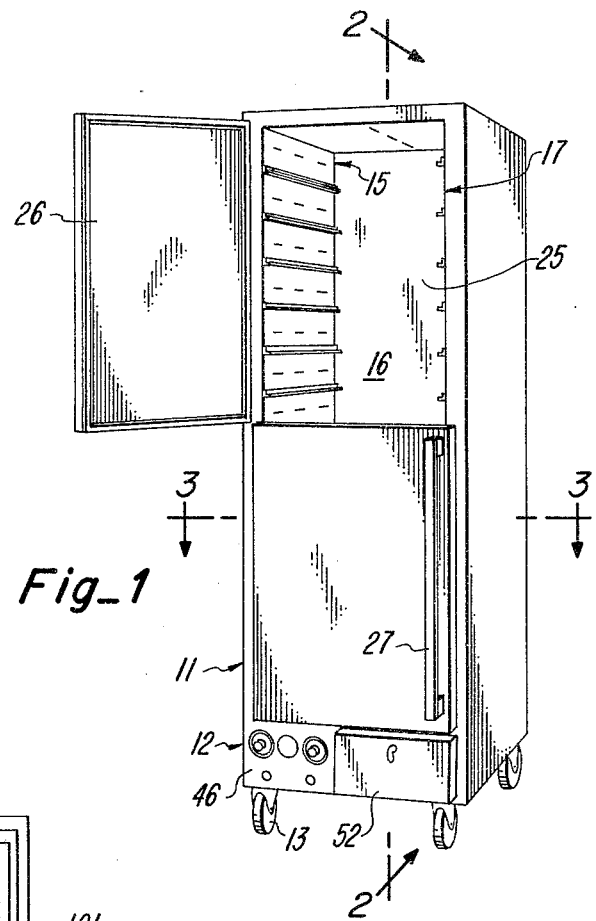
Fig_1
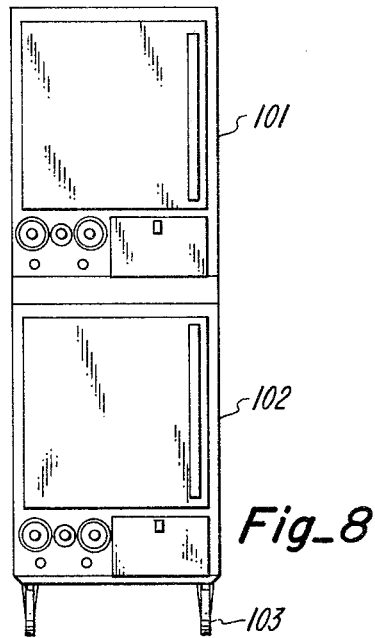
Fig_8
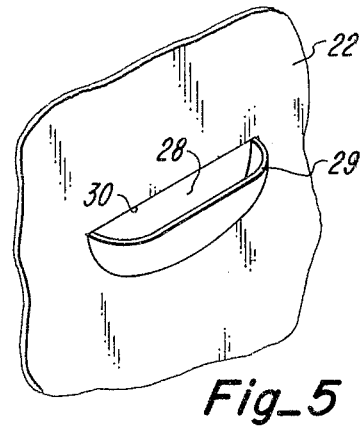
Fig_5

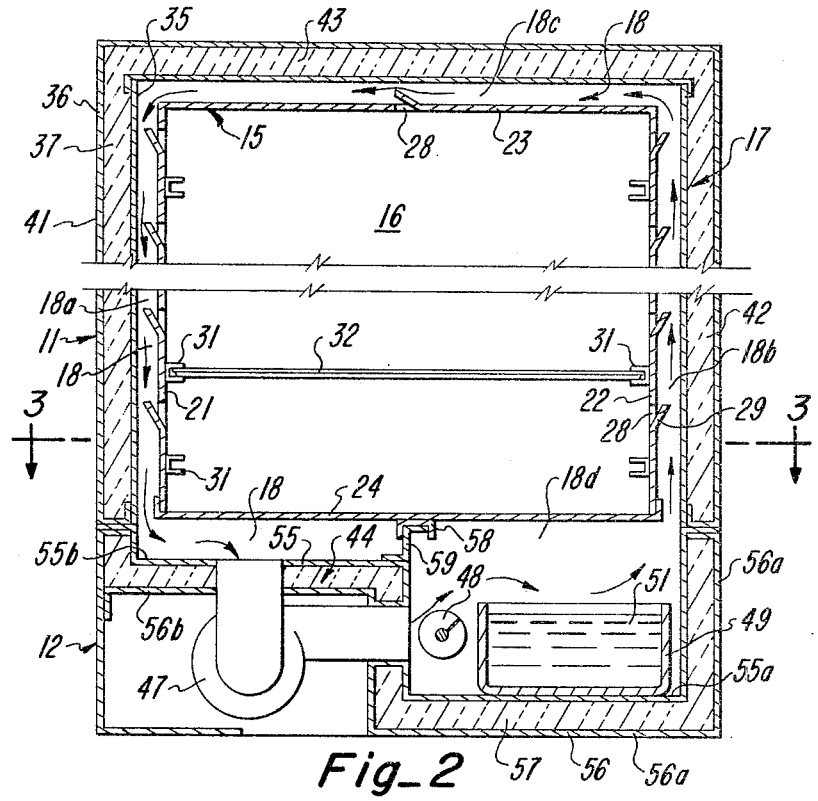
Fig_2
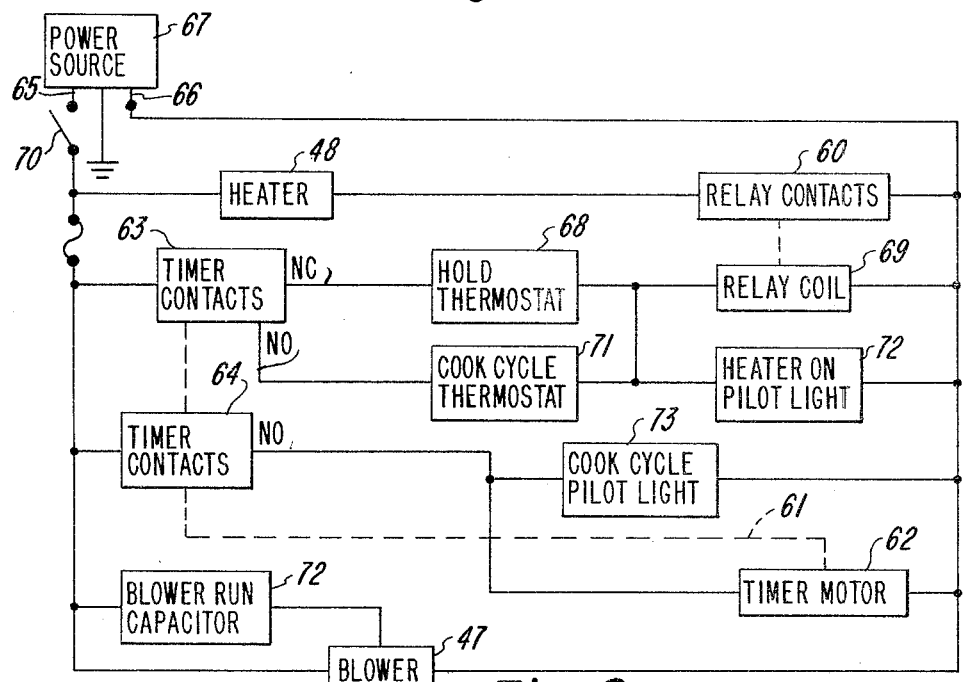
Fig_6

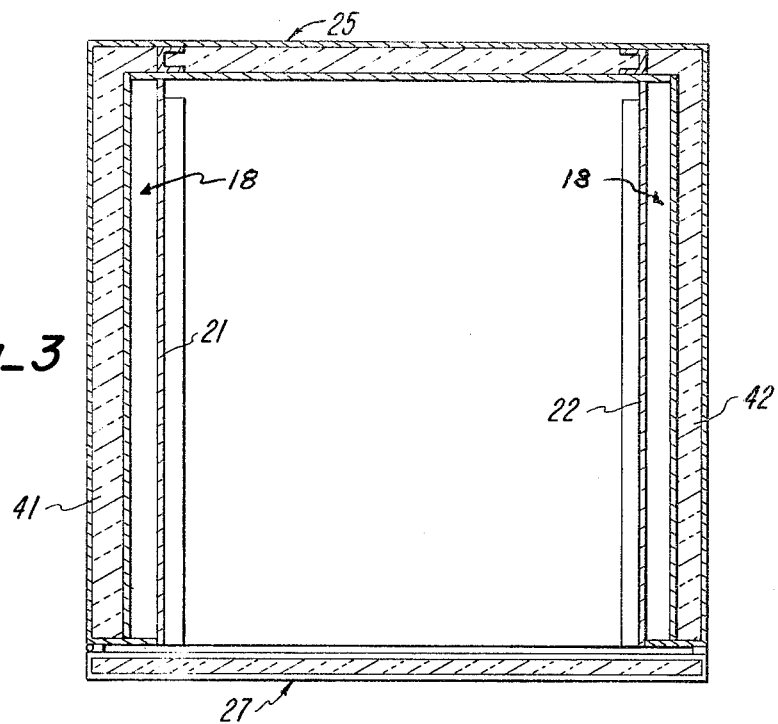
Fig_3
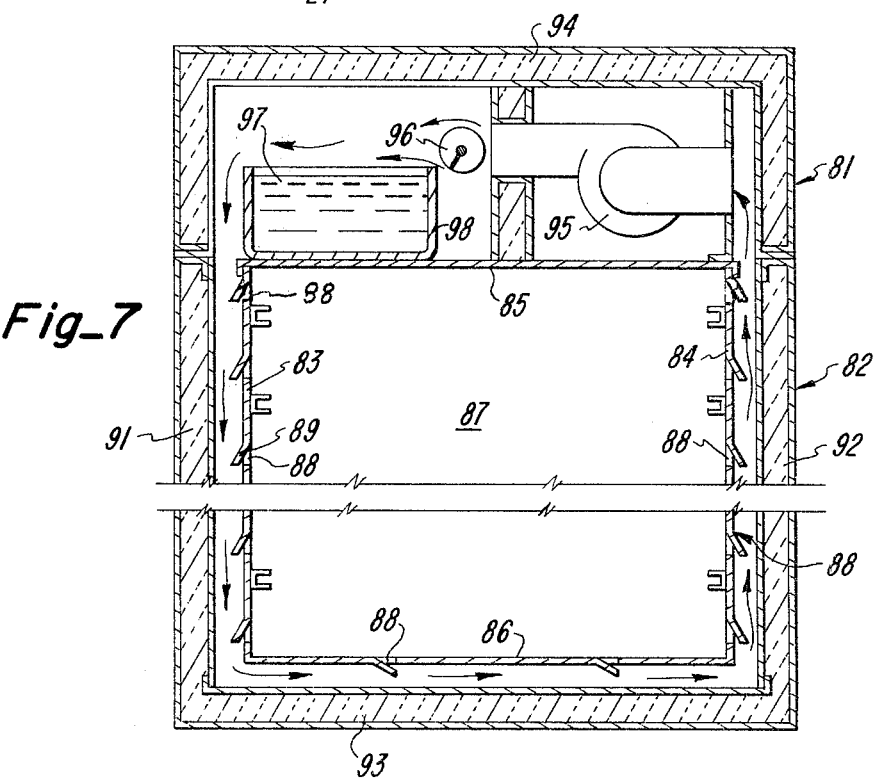
Fig_7

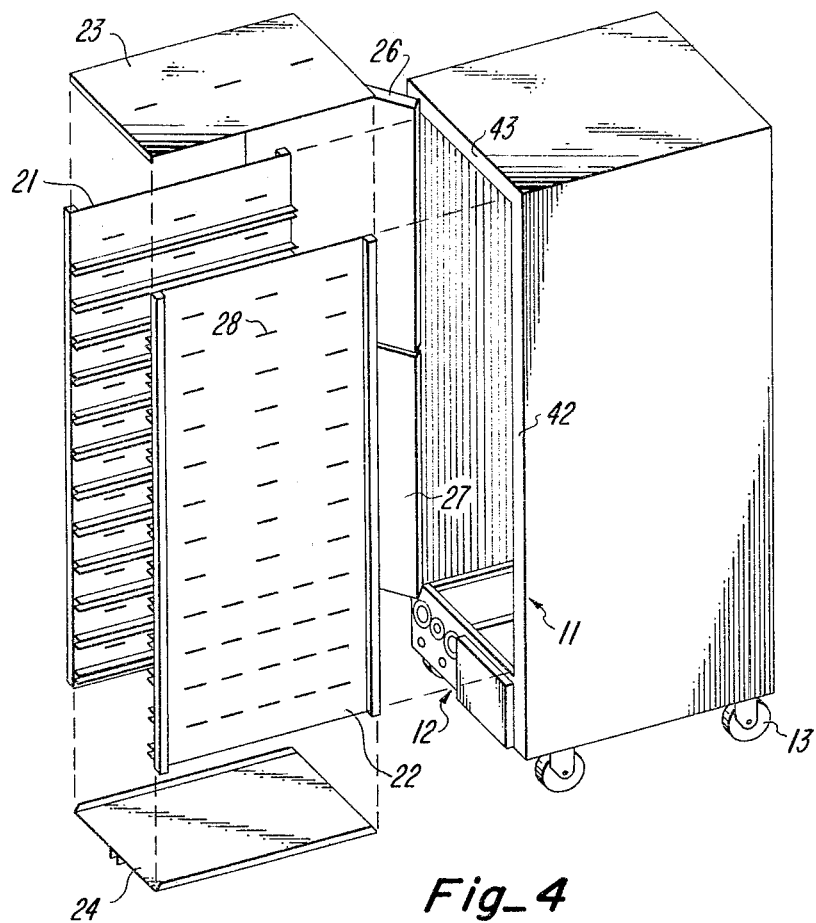
Fig_4

OVEN-TYPE APPARATUS AND METHOD

TECHNICAL FIELD

This invention relates to a novel and improved apparatus and method for cooking and holding food and the like.

BACKGROUND ART

The restaurant and fast-food industry require apparatus for holding food and for cooking purposes. A conventional oven does not hold food well because food retained therein for an extended length of time tends to dry out and merely adding moisture to food in this environment produces only soggy food. The blowing of any appreciable amounts of heated air over and in direct contact with the food for holding or cooking purposes tends to dry out the food. Heat lamps generally fail to retain a desirable internal continuous temperature and further they also tend to dry the food.

In earlier patents of the assignee of the present invention, including U.S. Pat. Nos. 3,868,941, 3,955,007, 3,999,475, 4,039,776, and 4,062,983, apparatus and methods are described for food holding purposes in which a stream of circulating air that has been heated and/or moisturized is passed around a stable inner core of air surrounding the food without a significant amount of airflow in direct contact with the food.

DISCLOSURE OF INVENTION

The present invention provides an apparatus and method for holding and cooking food wherein there is inner means with restricted louvered slots constructed and arranged to provide for additional moisture exchange and/or additional heat exchange between an outer stream of circulating air and the inner core of stable air surrounding the food, but again without any significant amount of airflow in direct contact with the food, as well as to control the moisture and establish substantially uniform temperatures throughout the inner core, to the end that the food retains its fresh-cooked taste, fragrance, and appearance.

Accordingly it is an object of the present invention to provide a novel and improved apparatus and method for holding and cooking food and the like wherein a passage circulates a stream of air around a stable core of air surrounding a food and restricted apertures are arranged to permit heat and moisture to pass therethrough without having a significant amount of air flowing in direct contact with the food.

Other objects, advantages and capabilities of the present invention will become more apparent as the description proceeds, taken in conjunction with the accompanying drawings in which like parts have like reference numerals and in which:

BRIEF DESCRIPTION OF DRAWINGS

FIG. 1 is a front perspective view of oven-type apparatus embodying features of the present invention shown with an upper front door moved to an open position and the lower front door in a closed position;

FIG. 2 is a sectional view taken along lines 2—2 of FIG. 1 with the central portion of the apparatus deleted as duplication;

FIG. 3 is a sectional view taken along lines 3—3 of FIG. 2;

FIG. 4 is a perspective view of the oven-type apparatus shown in FIGS. 1-3 with the top, bottom and side panels removed from the outer cabinet;

FIG. 5 is an enlarged perspective view of one of the louvered slots;

FIG. 6 is a schematic electric circuit diagram for the control of the heater and blower shown in FIGS. 1-3;

FIG. 7 is a vertical sectional view similar to that of FIG. 1 with the apparatus modified to the extent of having the heater, water pan and blower on top of the oven portion rather than the bottom thereof; and FIG. 8 is a front elevational view of a stacked form of the oven-type apparatus similar to that shown in FIGS. 1-6.

DETAILED DESCRIPTION

Referring now to the drawings, the oven-type apparatus shown in FIGS. 1-6 is generally comprised of a box-like cabinet 11 above a base wall 12 on casters 13 for wheeled movement. The cabinet 13 generally has a box-like inner compartment or inner wall means 15 forming an inner chamber 16, together with outer wall means 17 having wall portions spaced from opposite wall portions of said inner wall means 15 so as to form an air circulating passage 18 extending in a closed loop around the top, bottom, and opposite sides of inner chamber 16.

The inner wall means 15 shown includes a pair of opposed, parallel spaced, inner sidewall panels 21 and 22, an inner top wall panel 23, and an inner bottom wall panel 24 spaced from and parallel to the top wall panel 23. The back of the inner chamber is bounded by a rear wall 25 and the front of the inner chamber is bounded by an upper front door 26 and a lower front door 27, respectively, that are connected to hinges arranged for having the doors move between open and closed positions. The panels 21, 22, 23 and 24 are constructed and arranged to removably insert into the outer wall means 17, as best seen in FIG. 4.

The rear wall 25 is of a double-walled, heat-insulated construction using an outer panel, an inner panel, and a layer of heat insulation therebetween. In turn, each of the doors is of a similar double-walled, heat-insulated construction using an outer panel, an inner panel, and a layer of heat insulation therebetween. Each of these outer and inner panels preferably is made of sheet metal.

Each of the inner sidewall panels 21 and 22 is provided with a similar number and arrangement of a special form of restrictive apertures 28 which in the preferred embodiment are a louvered slot. As shown, these slots 28 are arranged in a pattern of parallel spaced columns as two side columns and a center column that extend from almost the top to almost the bottom of the panel, and there are two additional intermediate columns of apertures in a lower portion of the panel on opposite sides of the center column between the two side columns. In addition, the slots are in alinement across the panels in a plurality of rows, there being shown three slots in each row in the upper part of each side panel and five slots in each row in the bottom part of each side panel, so that there are more slots in the lower part of the side panel than in the upper part. When the side panels are in position in the apparatus, there are apertures in alinement directly opposite one another.

The apertures 28 are formed by a press or punching operation so that, as shown in FIG. 5, they are of a louvered construction with a portion of the metal panel being deformed away from a horizontal shear line 30 forming an inclined louver fin 29. These fins are arranged at an incline in relation to the direction of flow of circulating air in the circulating passage 18 and incline toward or away from the direction of airflow, as described hereinafter.

In general, the apertures 28 are sufficiently narrow to confine circulating air in the passage to the passage so that there is no significant amount of air-flow in direct contact with the food. Further, the apertures are arranged generally uniformly laterally of and along the vertical sections of the passage to enable heat and moisture to pass between the passage and inner chamber and control moisture and establish a suitably uniform temperature in the chamber. The apertures are elongated, having the long axis arranged transversely of the top and bottom edges of the panel, which also is transverse to the direction of airflow through the air circulating passage.

A typical panel for five trays is 28 inches wide and almost 21 inches high with 6.8 inches between the centers of the apertures in the upper portion of the panel and 4.3 inches between the centers of the apertures in the lower portion of the panel. The aperture is 1 3/16 inches and ¼ inch wide and the fin extends from the panel into the passage about 5/32 to 3/16 inch. This panel has a total of 22 apertures or slots so that the total area of the slots is small in comparison to the total area of the associated panel.

A tray support 31 shown in the form of a channel is mounted on each panel 21 and 22 facing inwardly toward the center of the inner chamber and between rows of slots 28 to provide opposed tray-receiving channels so that, when the trays 32 are positioned in the opposed tray supports 31, the oppositely disposed rows of slots open into the volume of air between the supported trays 32.

The outer wall means 17 shown includes a pair of opposed, parallel spaced, outer sidewalls 41 and 42 opposite and spaced from inner sidewall panels 21 and 22, respectively, to form vertical passage sections 18a and 18b, respectively, of air passage 18, an outer top wall 43 opposite and spaced from inner top wall panel 23 to form a horizontal top passage section 18c, and an outer bottom wall 44 opposite and spaced from the inner bottom wall panel 23 to form a bottom passage section 18d.

As with the rear wall 25 and doors 26 and 27 above described, these outer walls 41, 42, 43 and 44 are of a double-walled, heat-insulated construction using preferably an outer metal panel 36 and an inner metal panel 35 spaced from the outer panel with heat insulation 37 therebetween. Moreover, the double-walled constructed outer walls 41, 42, 43 and 44, the rear wall 25 and doors 26 and 27 fully enclose the inner chamber 16 and air circulating passage 18 to heat-insulate them to aid in maintaining substantially uniform temperatures in the inner chamber 16 for extended periods of time.

In this arrangement the passage 18 has a pressure end on the discharge or pressure side of a blower 47 that is flow-coupled to the vertical passage section 18b via part of bottom passage section 18d disposed over the water pan and the passage has a suction end on the suction side of the blower that is flow-coupled to the other vertical side passage section 18a so that the blower will recirculate the air in a loop around the inner chamber. The highest velocity airflow is in the passage section 18b and the fins therein are supported at an upstream edge of the associated slot and slant away in the direction of airflow in the passage to direct the airflow away from the associated slot. The lowest velocity airflow is on the suction side or in passage portion 18a and in this portion the fins are shown as supported at a downstream edge and slanted toward the direction of airflow.

The air moving through the passage will flow in essentially a circular or eddy current-type path into the louvered slot so that there is no significant amount of airflow produced in the inner chamber. At the same time, the heat and moisture are permitted to pass via the slots to control moisture and to maintain a uniform temperature. It is noted that the top wall panel 23 in the form shown in FIG. 2 has a louvered slot disposed centrally thereof and there are three louvered slots laterally of the panel whereby in the heating operation heated air collecting in the upper part of the chamber is passed back into the circulating stream of air to save energy.

The outer bottom wall 44 is a part of the base wall 12, which is constructed to contain and support the electric control shown in FIG. 6, provide control panel 46, and contain a blower 47, heater 48, and water pan 49 shown with water 51, with a door 52 providing access to the water pan.

The base assembly 12 shown is constructed using an inner base assembly 55 shaped preferably from one sheet of material and has a generally channel-shaped portion 55a containing the water pan, with a lateral portion 55b forming a part of the bottom of the air circulating passage portion 18d and an outer base assembly 56 having an upright channel-shaped portion 56a and an inverted channel-shaped portion 56b, the latter containing the blower 47. There is a layer of heat insulation 57 between the two assemblies 55 and 56. A guide 58 in the form of an inverted channel is mounted on the bottom of panel 24 that fits on a bracket 59 carried by assembly 55 to further support the inner bottom panel 25.

Referring now to FIG. 6, the control shown is adapted to actuate the heater to operate at one temperature of about 150° F. for food holding and at another temperature of about 200° F. for food cooking. The timer includes a timer motor 62 connected in a circuit with a set of normally open contacts 64 with the circuit connected across power input terminals 65 and 66 with the timer motor shaft 61 used to actuate the timer contacts 63, 64, as indicated by a dashed line. The timer, which has a non-rotating dial, is activated whenever a center button is pushed. Every time the center button is pushed the timer is reset to the initial dial setting. To turn the timer off, the dial is set back to zero.

A relay has a set of relay contacts 60 actuated upon the energization of a relay coil 69, contacts 60 being in a circuit with the heater 48 across the power terminals 65 and 66. Terminals 65 and 66 are shown as being supplied power by a power source 67 via an on-off power switch 70. A hold thermostat 68 is connected in a circuit with the normally closed timer contacts 63 and the relay coil 69, which circuit is connected across the power terminals 65 and 66.

The cook cycle thermostat 71 is connected in a circuit with the normally open timer contacts 63 and the relay coil 69. In this way power is applied to the relay coil through only one of the thermostats at a time. However, the relay coil is activated by either thermostat to apply power to the heater via the relay contacts 60.

When the apparatus is being used for heat holding only, the timer is turned to an off position. A heater-on pilot light 72 is connected across the relay coil 69 to indicate that electric power is being applied to the heater 48.

When the apparatus is used as a cooking oven the timer is turned on and the electric power is removed from the hold thermostat and applied to the cook-cycle thermostat, which in turn energizes the relay coil and heater-on pilot light goes on. In addition, a cook cycle pilot light 73 is connected in parallel with the cook cycle thermostat to indicate that the cooking operation is taking place.

The motor of blower 47 is connected across the input terminals 65 and 66 via the power switch 70 and therefore runs all the time the apparatus is operating. A blower-run capacitor 72 is connected between one terminal and the motor of blower 47 to provide higher motor torque once the blower motor reaches operating speed.

Operation

With the heater and blower actuated, the air is circulated over the water 52 and up through the passage section 18b, through the top passage section 18c, down the passage section 18b, and through a portion of the bottom passage section 18d in a closed loop. This circulating air, which has a higher velocity than the core of air in the chamber, is at a higher pressure than the inner core or, stated another way, produces a slight vacuum inside the inner chamber as is the case in a vortex, and this draws moisture out into the circulating air to control the air so that the food does not become soggy. At the same time heat passes through these apertures back into the recirculating higher velocity air to assist in providing uniformity of temperature throughout the inner chamber as an energy saver.

Referring now to FIG. 7, the oven-type apparatus shown has what was formerly identified as the base wall 12 now mounted as a top wall 81 on top of a box-like cabinet 82. The cabinet 82 includes opposed inner sidewall panels 83 and 84, a top inner wall panel 85 and a bottom inner wall panel 86 bounding the inner chamber 87. There are also provided restricted louvered slots 88 in the side and bottom panels with louvered fins 89 in an arrangement of uniformly spaced columns and rows, as above described. In addition, there are outer sidewalls 91 and 92, an outer bottom wall 93 and an outer top wall 94 arranged to form the closed-loop passage 88. In this form the blower 95 circulates air over the heater 96, over the water 97 in pan 98, down through a downflowing vertical passage section, across a bottom passage section, and up an upflowing vertical passage section.

The louvered fins in the downflowing vertical passage section are affixed upstream of the associated slot and extend on an incline away from the flow of air in the passage, and the same is true in the bottom passage section, while in the upflowing vertical passage section on the suction side of the blower the fins are attached at the downstream side and extend at an incline into the passage so that in both forms of FIGS. 2 and 7 there are louvered slots in a horizontal section of the passage. In addition, the louvered slots in the inner sidewall panels of the form shown in FIG. 7 are closer to the top wall to release heat in the top of the chamber back into the stream of circulating air.

Referring now to FIG. 8, the oven-type apparatus shown has two oven-type units 101 and 102 stacked one on another with casters 103 on the bottom unit to allow cooking in one unit and holding in the other unit.

Industrial Applicability

The present invention maintains a variety of foods at uniform temperatures and in a moisturized environment so that they retain their taste, appearance and size for extended periods of time in one mode of operation, and is particularly suited for slow cooking of meats in another mode of operation to provide restaurants, fast-food stores, and similar food handling establishments with a better way of delivering cooked foods to the customers.

Although the present invention has been described with a certain degree of particularity, it is understood that the present disclosure has been made by way of example and that changes in details of structure may be made without departing from the spirit thereof.

What is claimed is:

1. Oven-type apparatus for food and the like comprising:

inner wall means defining an inner chamber and outer wall means including outer wall portions spaced from opposite inner wall portions of said inner wall means defining an air circulating passage extending in a loop around said inner chamber through which a stream of circulating air is adapted to be passed, said passage including both generally horizontal and generally vertical passage sections, a pressure end and a suction end opposite said pressure end, said wall portions of said inner wall means having a plurality of restrictive apertures in both of said passage sections, said apertures being sufficiently narrow to confine circulating air substantially to said passage without a significant amount of airflow in direct contact with a food and the like disposed in said chamber and suitably positioned along said generally horizontal and generally vertical sections between said pressure and suction ends to enable moisture and heat to pass between said passage and said chamber via said apertures, to control moisture in the chamber and to establish a substantially uniform temperature throughout said chamber;

means coupled between said pressure end and said suction end of said passage for moving a stream of circulating air via said passage; and means for heating said circulating air to a selected temperature.

2. Oven-type apparatus as set forth in claim 1 wherein said restrictive apertures are in the form of a louvered slot disposed transversely in relation to the direction of airflow in said passage and has a fin portion supported along one edge of an associated slot and extending into the passage.

3. Oven-type apparatus as set forth in claim 2 wherein said louvered slot includes a straight transverse shear line and a deformation of a segment of the panel material away from the shear line into the passage to extend at an angle to the plane of the panel.

4. Oven-type apparatus as set forth in claim 1 wherein said restrictive apertures are generally uniformly spaced along and laterally of the generally vertical passage section.

5. Oven-type apparatus as set forth in claim 4 wherein there are more of said restrictive apertures in the lower than in the upper portion of said generally vertical passage section.

6. Oven-type apparatus as defined in claim 1 wherein there are two oppositely disposed, generally vertical passage sections and said apertures are arranged in said wall portions of said inner wall means in directly opposed columns and rows.

7. Oven-type apparatus as defined in claim 6 including tray supports on said inner wall means between said apertures in said columns whereby said opposed apertures are in flow communication with the aiy space between horizontal trays disposed in said chamber.

8. Oven-type apparatus as set forth in claim 1 wherein said inner wall means includes an inner top wall panel, opposed, spaced, inner sidewall panels, an inner bottom wall panel, a door adapted to move between an open position to provide access into said chamber and a closed position, and a rear wall.

9. Oven-type apparatus as set forth in claim 1 wherein said outer wall means includes a double-walled outer shell having heat insulation between outer and inner panels to heat-insulate said air circulating passage and said inner chamber from the ambient temperature of the surrounding environment.

10. Oven-type apparatus as set forth in claim 1 wherein said air circulating passage extends along opposed sides, across the top, and across the bottom of said inner chamber.

11. Oven-type apparatus as set forth in claim 1 wherein said inner wall means includes:
first and second inner, generally vertical, sidewall panels oppositely disposed from one another,
each of said sidewall panels having a plurality of narrow transverse slots formed therein and arranged at generally uniform spaced columns and rows,
said first sidewall panel being on the pressure side of said means for moving air and having a louvered fin portion supported at an upstream edge of each slot and slanted away from the direction of airflow along said first sidewall panel to direct the airflow away from the associated slot,
said second sidewall panel being on the suction side of said means for moving air and having a louvered fin portion supported at the downstream edge of each slot therein and slanted toward the direction of airflow along said second panel to direct the airflow in said passage toward the associated slot.

12. Oven-type apparatus as set forth in claim 11 including a generally horizontal inner wall panel connected between said first and second sidewall panels, said generally horizontal inner wall panel having at least one row of narrow transverse slots with a louvered fin connected at an upstream edge of the associated slot and slanted away from the direction of airflow to direct the airflow in said passage away from the associated slot.

13. Oven-type apparatus as set forth in claim 12 wherein said generally horizontal inner wall panel extends along the top of said inner chamber.

14. Oven-type apparatus as set forth in claim 12 wherein said generally horizontal inner wall panel extends along the bottom of said inner chamber.

15. Oven-type apparatus as set forth in claim 13 wherein said means for moving the air and said means for heating the air are disposed above said top inner wall panel.

16. Oven-type apparatus as set forth in claim 14 wherein said means for moving the air and said means for heating the air are disposed below said bottom inner wall panel.

17. Oven-type apparatus as defined in claim 1 wherein said means for moving the air includes a blower having a discharge side and a suction side and said means for heating includes a heater disposed in said passage downstream of the discharge side of said blower.

18. Oven-type apparatus as defined in claim 17 including a source of moisture in said passage downstream of said heater.

19. Oven-type apparatus as defined in claim 17 including control means for controlling power to said blower and said heater having means for selecting the amount of heat produced by said heater.

20. Oven-type apparatus as defined in claim 18 including means for setting the temperature for cooking at a higher temperature and alternatively for food holding at a lower temperature.

21. Oven-type apparatus as defined in claim 19 wherein said control means includes a thermostat for the holding temperature, a thermostat for the cooking temperature, a timer, and relay means operatively associated with said heater and said thermostats whereby power is applied to only one of said thermostats at a time, said timer being off during the heat holding cycle and on during the cooking cycle.

22. Oven-type apparatus as defined in claim 21 wherein said blower is actuated independently of said heater.

23. Oven-type apparatus as defined in claim 1 wherein two independently operable inner chambers are arranged one on another to provide alternate holding and cooking in a single unit.

24. Oven-type apparatus for food and the like comprising:
a box-like cabinet member having inner wall means including inner wall portions defining an inner chamber and outer wall means including outer wall portions spaced from opposite of said inner wall portions to form a closed-loop air circulating passage including a generally vertical passage section outwardly of the sides, a generally horizontal top passage section outwardly of the top of said chamber and a generally horizontal bottom passage section outwardly of the bottom of said chamber,
said inner wall portions including a pair of opposed, spaced, inner sidewall panels, an inner top wall panel and an inner bottom wall panel, a rear wall, and at least one door at the front, said inner wall panels being removably inserted into said outer wall means, said inner wall panels having narrow, restrictive, transverse slots in both of said generally horizontal and generally vertical passage sections,
said slots being sufficiently narrow to confine circulating air substantially to said passage without a significant amount of airflow in direct contact with a food and the like in said chamber and positioned in a pattern of uniformly spaced rows and columns to enable moisture and heat to pass between said passage and said chamber via said apertures and to establish a substantially uniform temperature throughout said chamber,
said outer wall means including an outer wall assembly disposed outwardly of one of said inner top wall panels and inner bottom wall panels defining an outer boundary of one of said generally horizontal passage sections;

blowing means in said outer wall means coupled between said pressure end and said suction end of said passage for moving a stream of circulating air via said passage;

heating means in said outer wall means in said passage for heating said circulating air;

a water sourse in said outer wall means for adding moisture to said circulating air; and control means in said outer wall means for controlling the heat produced by said heater means and for controlling said blowing means, including a control panel associated with said outer wall means.

25. A method of cooking and holding cooked foods at selected temperatures for extended periods of time comprising the steps of forming a passage to direct a stream of circulating air in a loop around a stable core of air surrounding a food and the like and providing restricted apertures in said passage that are sufficiently narrow to maintain said circulating air substantially in said passage without any significant amount of air flowing in direct contact with the food, and positioning said apertures to permit moisture and heat to pass between said stable core and said stream of circulating air to provide moisture control for said core of air and to establish a substantially uniform temperature of the food and the like.

26. A method as set forth in claim 25 wherein said passage includes at least one substantially horizontal passage section and at least one substantially vertical passage section with said restricted apertures being in both of said sections.

27. A method as set forth in claim 25 wherein said circulating air is passed around the top, along the sides and under the bottom of said inner chamber.

* * * * *